(12) United States Patent
Xiao et al.

(10) Patent No.: US 6,370,357 B1
(45) Date of Patent: Apr. 9, 2002

(54) MOBILE SPEED ESTIMATION FOR DIGITAL CELLULAR RADIO SYSTEMS

(75) Inventors: Chengshan Xiao; Karl D. Mann, both of Nepean; Jan C. Olivier, Kanata, all of (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/217,064

(22) Filed: Dec. 21, 1998

(51) Int. Cl.[7] ............................................. H04B 17/00
(52) U.S. Cl. ........................................ 455/67.1; 455/442
(58) Field of Search ............................. 455/441, 442; 342/46.1, 418, 67.1; 73/1.37

(56) References Cited

U.S. PATENT DOCUMENTS

| | | | | |
|---|---|---|---|---|
| 5,396,253 A | * | 3/1995 | Chia | 342/104 |
| 5,396,645 A | * | 3/1995 | Huff | 455/33.4 |
| 5,438,595 A | * | 8/1995 | Cheng et al. | 375/340 |
| 5,585,805 A | | 12/1996 | Takenaka et al. | 342/461 |
| 5,686,925 A | | 11/1997 | Maeda et al. | 342/457 |
| 5,722,072 A | | 2/1998 | Crichton et al. | 455/437 |
| 5,787,348 A | | 7/1998 | Willey et al. | 455/441 |
| 5,884,178 A | * | 3/1999 | Ericsson et al. | 455/441 |

OTHER PUBLICATIONS

T. L. Doumi and J. G. Gardiner, Use of Base Station Antenna Diversity for Mobile Speed Estimation, Electronics Letters, Oct. 27, 1994, vol. 30, No. 22, pp. 1835–1836.

Martin Hellebrandt, Rudolf Mathar, and Markus Scheibenbogen, Estimating Position and Velocity of Mobiles in a Cellular Radio Network, IEEE Transactions on Vehicular Technology, Feb. 1997, vol. 46, No. 1, pp. 65–71.

Kazuo Kawabata, Takabaru Nakamura, and Eisuke Fukuda, Estimating Velocity Using Diversity Reception, Mar. 1994, pp. 371 to 374.

Ashwin Sampath and Jack M. Holtzman, Estimation of Maximum Doppler Frequency For Handoff Decisions, 1993, pp. 859–862.

Ling Wang, Marko Silventoinen and Zhichun Honkasalo, A New Algorithm For Estimating Mobile Speed at the TDMA––Based Cellular System, pp. 1145–1149.

Okada K. et al.: "A Dynamic Channel Assignment Strategy Using Information on Speed and Moving Direction for Micro Cellular Systems", IEICE Transactions on Communications, Institute of Electronics Information and Comm. Eng. Tokyo, JP, vol. E79–B, no. 3, (1996–03–01) pp. 279–288.

Kawabata et al.: "Estimating velocity using diversity reception", Vehicular Technology Conference, 1994 IEEE 44th Stockholm, Sweden 8–10 June 1994, New York, NY, USA, pp. 371–374.

Austin M.D. et al.: "Velocity Adaptive Handoff Algorithms for Microcellular Systems", IEEE Transactions on Vehicular Technology, IEEE Inc. New York, vol. 43, No. 3, Part 1, (1994–08–01) pp. 549–561.

* cited by examiner

Primary Examiner—Vivian Chang
Assistant Examiner—Naghmeh Mehrpour

(57) ABSTRACT

For a hierarchical mobile cellular communications system comprising a plurality of microcells and overlaid macrocells, a method is disclosed for estimating the speed of a mobile. The speed estimate assists in the assignment of slow-moving mobiles to microcells and fast-moving mobiles to macrocells, thus keeping the cellular system in optimum utilization. The method first calculates a power signal of the received signals. The power signal is then filtered and decimated. The speed of a mobile is estimated from a determination of the offset autocorrelation of the filtered and decimated power signal.

19 Claims, 7 Drawing Sheets

MOBILE SPEED ESTIMATION FOR DIGITAL CELLULAR RADIO SYSTEMS

FIELD OF THE INVENTION

The invention relates to cellular radio systems and, in particular, to estimation of speed of a mobile in digital radio systems such as TDMA based systems.

BACKGROUND OF THE INVENTION

Cellular telephony is a type of short-wave analog or digital transmission in which a subscriber has a wireless connection from a mobile telephone to a relatively nearby base station. The base station's span of coverage is called a cell. Typically, cellular telephone service is available in urban areas and along major highways but may also be available in some suburban and rural areas. As the cellular telephone user moves from one cell or area of coverage to another, the telephone is effectively passed on to the local cell base station. This passing from base station to base station is called a handoff.

AMPS (Advanced Mobile Phone Service) is a standard system for analog signal cellular telephone service in the United States and is also used in other countries. Time Division Multiple Access (TDMA) is digital transmission technology which allows a number of users to access a single radio frequency channel without interference by allocating unique time slots to each user within each channel. The TDMA digital transmission scheme multiplexes multiple users over a single channel. The current North American TDMA (NA-TDMA) standard for cellular divides a single channel into six time slots, with each user using two slots, providing three times the capacity of AMPS. Each caller is assigned specific time slots for transmission. One "frame" includes six slots and has a 40 ms duration. A "slot burst" lasts 20 ms and includes only three slots. NA-TDMA was first specified as a standard in Electronics Industries Association/Telecommunication Industries Association (EIA/TIA) Interim Standard 54 (IS-54). IS-136 is an evolved version of IS-54.

To cope with the rapidly increasing demand for mobile and personal communications, hierarchical cellular systems, which have multiple layer cellular cells are being deployed in dense urban areas. Specifically, a two-layer hierarchical cellular system consists of microcells overlaid with macrocells, where a macrocell is the union of many microcells. Thus slow-moving mobiles are assigned to microcells and fast-moving mobiles are assigned to macrocells. This approach has an objective of decreasing handoff rate for fast moving mobiles. Hence, a reliable mobile speed estimator is desirable. Benefits of decreasing handoff rate include an increase in capacity for the system and a decrease in the number of dropped calls. As well, voice quality is improved due to reduction of the number of times the voice is muted for handoff.

In the literature, there are a few methods of mobile speed estimation which have been published. Specifically, in A. Sampath and J. M. Holtzman, "Estimation of Maximum Doppler Frequency for Handoff Decisions," Proceedings of IEEE Vehicular Technology Conference, pp.859–862, 1993, the estimation of maximum Doppler frequency can be used to estimate mobile speed for handoff decisions. This approach fails if the spectrum of a fading process has many local maxima. The maximum Doppler frequency can not be easily determined in this case due to different levels of energy at these frequencies.

In K. Kawabata, T. Nakamura, and E. Fukuda, "Estimating velocity using diversity reception," Proceedings of IEEE Vehicular Technology Conference, vol.1, pp.371–374, 1994 and U.S. Pat. No. 5,585,805 issued Dec. 17, 1996 to Tetsuyoshi Takenaka et al. a diversity switching number is used to estimate mobile speed. It is pointed out in T. L. Doumi and J. G. Gardiner, "Use of base station antenna diversity for mobile speed estimation," Electronics Letters, vol.30, no.22, pp.1835–1836, 1994 that this method is highly dependent on the fading distribution statistical properties (Rayleigh fading, Rician fading, etc.) and since it is not easy to know the distribution in advance, this method is not very reliable in practice.

In L. Wang, M. Silventoinen and Z. Honkasalo, "A new algorithm for estimating mobile speed at the TDMA-based cellular system," Proceedings of IEEE Vehicular Technology Conference, pp.1145–1149, 1996, two methods use deviation of received signal strength to estimate mobile speed for Global System for Mobile communication (GSM) radios. Unfortunately, the first method may fail when applied to a signal on a dispersive channel, i.e., in the presence of intersymbol interference. The second method uses pattern recognition to overcome the limitations of the first method on dispersive channels but leads to high computational complexity and may not be reliable. This method can also be applied for IS-136 radios.

In M. Hellebrandt, R. Mathar, and M. Scheibenbogen, "Estimating Position and Velocity of Mobiles in A Cellular Radio Network," IEEE Transaction on Vehicular Technology, vol.46, pp.65–71, 1997, multiple base stations and multidimensional scaling are used to estimate mobile speed. This method may be very expensive in practice.

In W. C. Y. Lee, Mobile Communications Engineering, McGraw-Hill, 1982 (the contents of which are incorporated herein by reference), the level crossing rate (LCR) is used to estimate mobile speed for AMPS radios, unfortunately, it is not reliable for TDMA radios.

U.S. Pat. No. 5,787,348 issued Jul. 28, 1998 to William Willey et al. uses received signal strength and level crossing rate to measure a mobile's speed. Unfortunately, fluctuations in power of the received signal affect the accuracy of result. As well, this method may not be effective in TDMA due to the inherent 50 Hz interference from the 20 ms slot burst time.

Paul Crichton et al. disclose in U.S. Pat. No. 5,722,072 issued Feb. 24, 1998 a method for determining a handover for a mobile station in a multicellular communication system. Again, received signal strength and level crossing rate are employed. In this method, however, several neighbour cells report to a serving cell which performs the handover determination. Generally, it is expensive to receive reports from several cells.

In U.S. Pat. No. 5,686,925 issued Nov. 11, 1997 to Maeda et al. Global Positioning System (GPS) information is used to determine the speed of a mobile. A disadvantage of this method is a requirement for lines of sight to GPS satellites, which is particularly problematic in urban centres. Although adding GPS circuitry to new mobile handsets may be feasible, supplementing existing handsets with GPS capabilities may be impractical.

Overall, it is necessary to obtain a more reliable algorithm to estimate mobile speed for TDMA-based radios, if handoff reliability in multi-layer hierarchical cells is to be increased.

SUMMARY OF THE INVENTION

The method of the subject invention provides mobile speed estimation. A power signal is derived from samples of a received signal. By comparing an estimate of an offset autocorrelation of the power signal to a threshold, the speed of the mobile may be estimated as "fast" or "slow". (An "offset" autocorrelation is an autocorrelation where the signal is correlated with a version of itself which has been offset in time.)

In accordance with an aspect of the present invention there is provided a method for estimating a speed of a mobile communication apparatus in a digital mobile communication network. The method includes receiving samples of a signal from the mobile communication apparatus and deriving a power signal from the samples. The method further includes estimating an offset autocorrelation value of the power signal by correlating said power signal with a version of itself offset in time. The offset autocorrelation value is representative of the speed of the mobile communication apparatus.

In accordance with another aspect of the present invention there is provided a computer software medium, for providing program control for a manager of a system which carries out the method of the present invention.

In accordance with a further aspect of the present invention there is provided a speed estimation apparatus for carrying out the method of the present invention.

In accordance with a still further aspect of the present invention there is provided a base station for mobile communications including at least one antenna for receiving a signal from a mobile communication apparatus and at least one analog to digital converter for creating samples of said signal from said mobile communication apparatus. The base station also includes a system controller, a phone service interface and at least one speed estimation apparatus operable to carry out the method of the present invention.

In accordance with another aspect of the present invention there is provided a system for mobile communication including a mobile communication apparatus and a base station including a speed estimation apparatus operable to carry out the method of the present invention.

BRIEF DESCRIPTION OF THE DRAWINGS

In the figures which illustrate example embodiments of this invention.

DETAILED DESCRIPTION OF THE PREFERRED EMBODIMENTS

Figure 1:
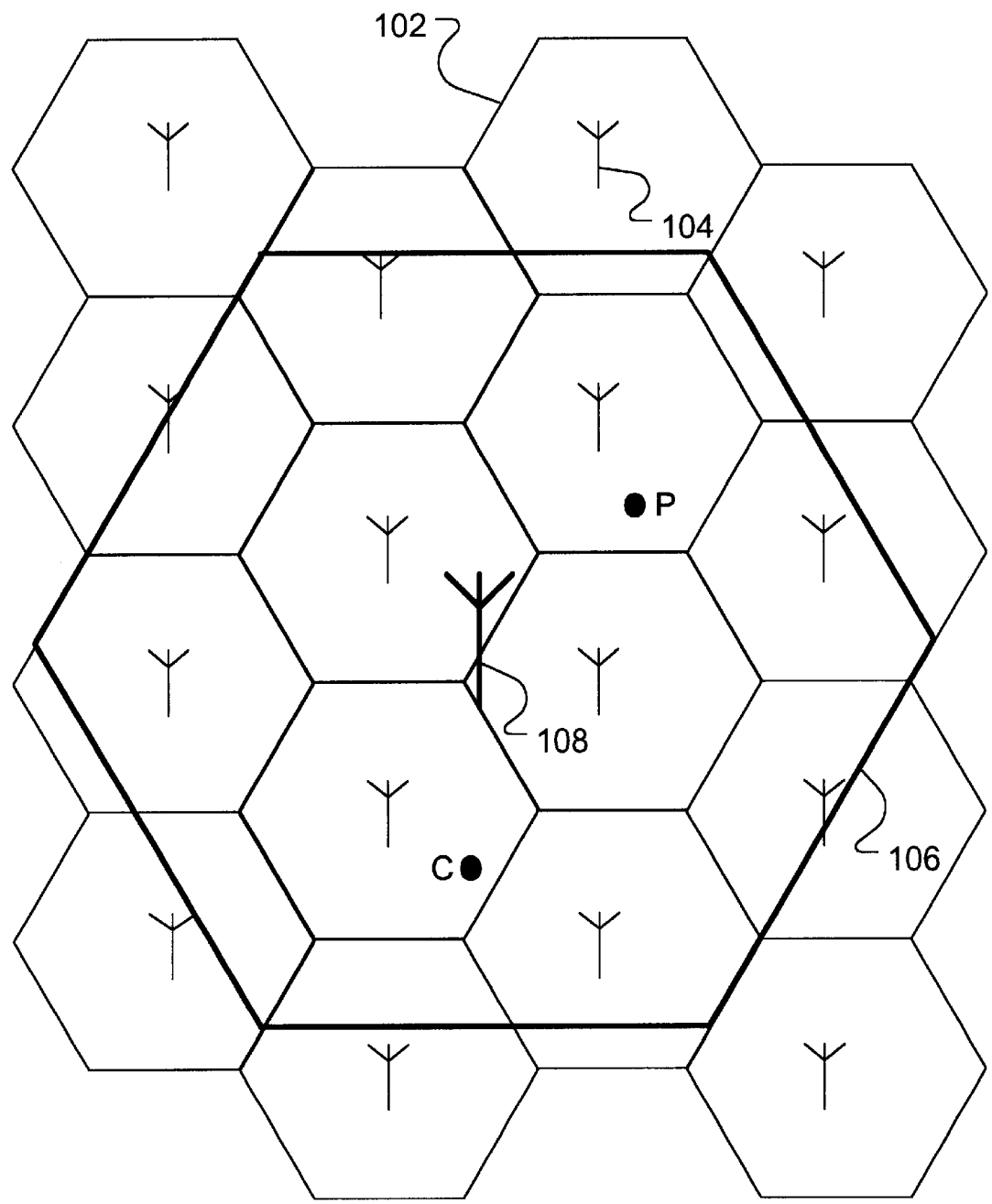
FIG. 1 schematically illustrates a two layer hierarchical cellular communication system.

Illustrated in FIG. 1 is a two layer digital cellular system including a microcell 102 with corresponding base station 104 and many like microcells arranged in a traditional manner. Overlaying the arrangement of microcells is a macrocell 106 with a corresponding base station 108. Within this arrangement of cells is a slow moving mobile P and a fast moving mobile C. It will be apparent to a person skilled in the art that microcells may not be in as regular a pattern as portrayed in FIG. 1.

Figure 2:
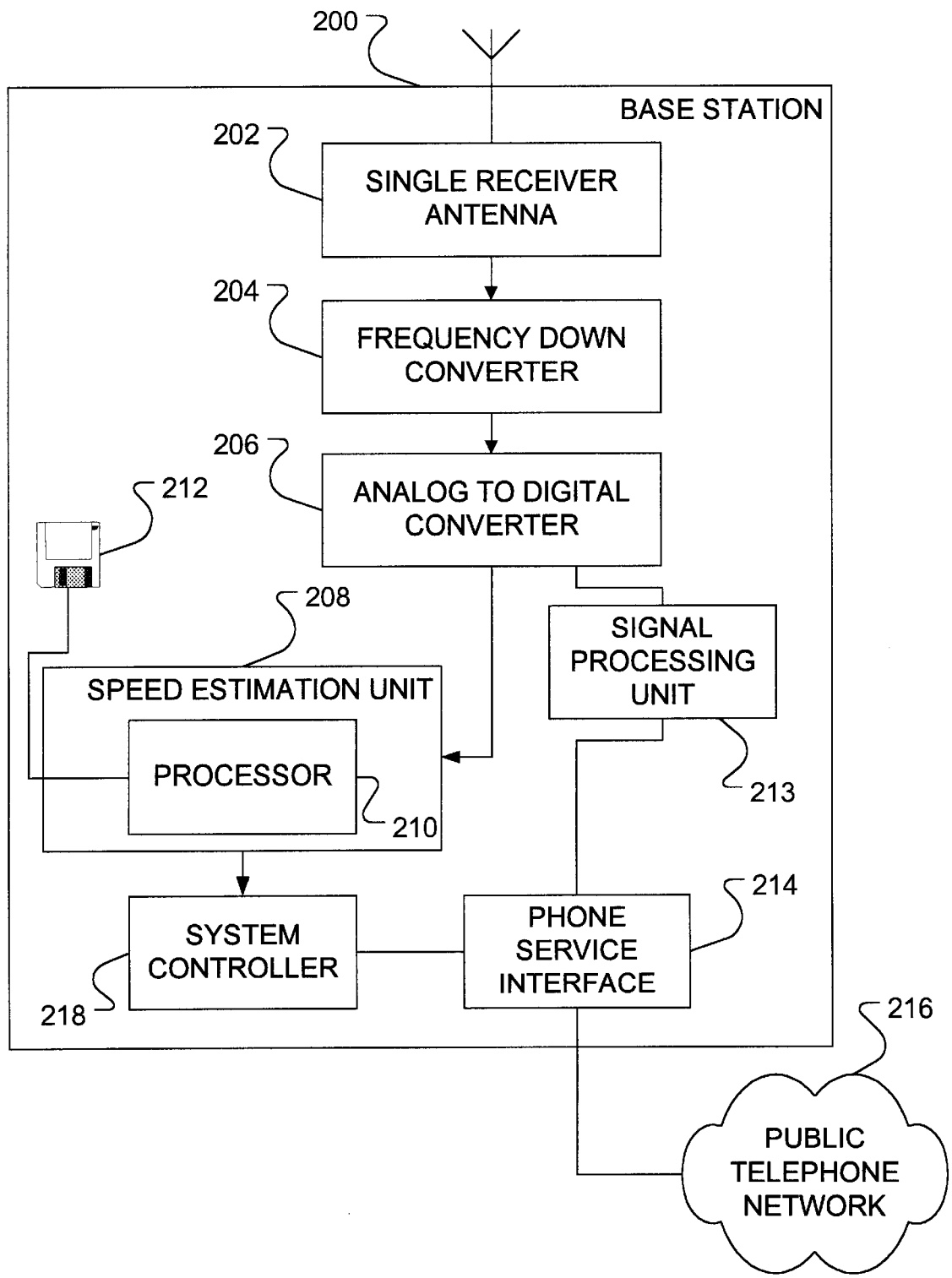
FIG. 2 illustrates a simplified base station, including an embodiment of the present invention.

FIG. 2 illustrates a simplified base station 200, including a speed estimation unit exemplary of a preferred embodiment of the present invention, that may be used to estimate the speed of a mobile.

In FIG. 2, a signal may be received by a single receiver antenna 202 connected to a frequency down converter 204 which is in electrical communication with an analog to digital converter 206. A speed estimation unit 208, including a processor 210 loaded with system management software for executing the method of this invention from software medium 212, which could be any media including a disk, a tape, a chip or a random access memory containing a file downloadable from a remote source. Speed estimation unit 208 receives samples of a received signal from analog to digital converter 206. An estimation of the speed of the mobile may be communicated from speed estimation unit 208 to a system controller 218 for use in making handoff decisions. Connected to analog to digital converter 206, via signal processing unit 213, is phone service interface 214 for communicating with public telephone network 216 including both wireless and wireline networks.

In overview and with reference to FIG. 2, a signal is received by single receiver antenna 202. Once a carrier signal is removed by frequency down converter 204, the information component is converted to a digital time series having complex valued samples $V_R(k)=I(k)+jQ(k)$ by analog to digital converter 206. The time series is then communicated to speed estimation unit 208. Speed estimation unit 208 determines a power of the received signal, s(k), which is then filtered for noise and interference to give $s_F(k)$ and then, for computational ease, decimated with $s_D(m)$ as the result. Preferably, an estimated offset autocorrelation value of the power signal $s_D(m)$ is then calculated (i.e., $R_D(n)$ is determined for some n≠0) and normalized, resulting in $R_D(n)/R_D(0)$. A comparison is then made between $R_D(n)/R_D(0)$ and a threshold. A normalized offset autocorrelation value greater than the threshold indicates a slow moving mobile and a normalized offset autocorrelation value less than the threshold indicates a fast moving mobile.

Figure 3:
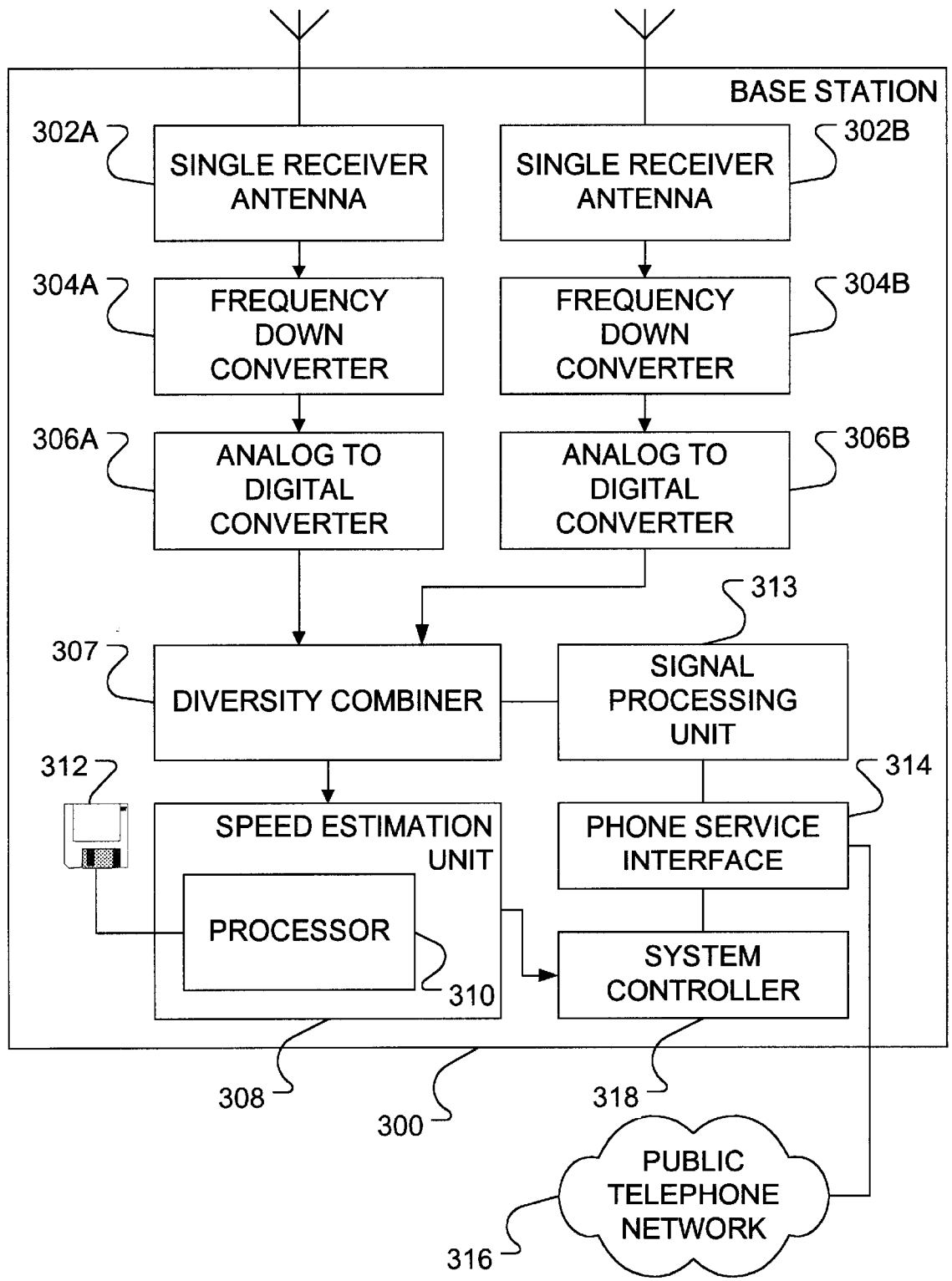
FIG. 3 illustrates a simplified base station using diversity reception and an embodiment of the invention.

FIG. 3 illustrates an alternative simplified base station 300, including a speed estimation unit 308 exemplary of a preferred embodiment of the present invention. Speed estimation unit 308 may be used to estimate the speed of a mobile in an identical fashion to speed estimation unit 208 of FIG. 2.

In FIG. 3, a signal may be received at by both single receiver antennas 302A, 302B, each connected to a corresponding frequency down converter 304A, 304B in electrical communication with an analog to digital converter 306A, 306B. Within a base station 300, a diversity combiner 307 receives samples of a received signal from each analog to digital converter 306A, 306B and yields a combined received signal which is sent to speed estimation unit 308, including a processor 310 loaded with system management software for executing the method of this invention from software medium 312. An estimation of the speed of the mobile may be communicated from speed estimation unit 308 to a system controller 318 for use in making handoff decisions. Connected to diversity combiner 307, via signal processing unit 313, is phone service interface 314 for communicating with public telephone network 316.

Figure 4:
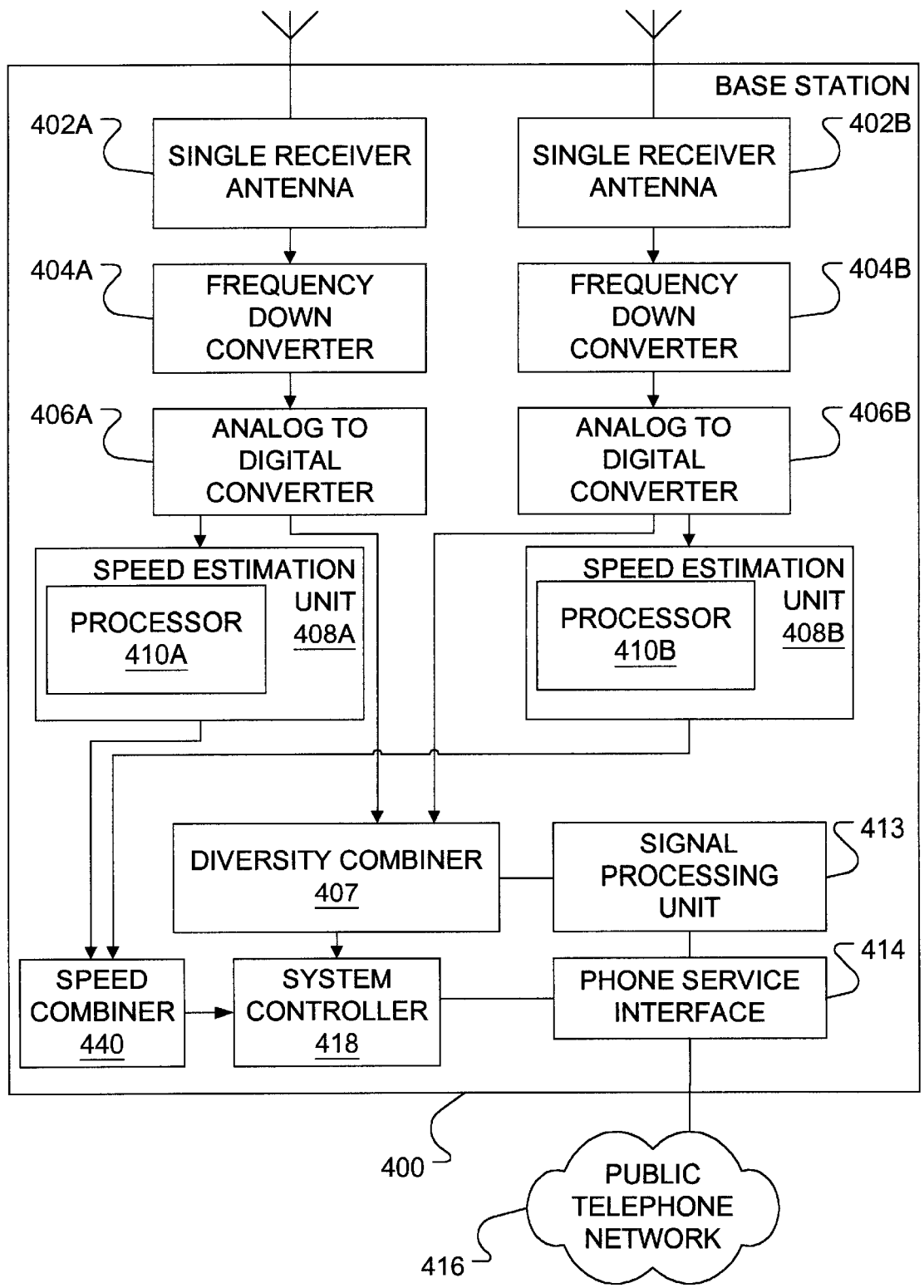
FIG. 4 illustrates an alternative to the diversity reception of FIG. 3 in an embodiment of the invention.

FIG. 4 illustrates an alternative simplified base station 400, using diversity reception differently than FIG. 3. In FIG. 4, speed estimation units 408A, 408B exemplary of a preferred embodiment of the present invention bypass a diversity combiner 407. Speed estimation units 408A, 408B may be used to estimate the speed of a mobile in an identical fashion to speed estimation unit 208 of FIG. 2.

A signal may be received by both single receiver antennas 402A, 402B, each connected to a corresponding frequency down converter 404A, 404B in electrical communication with an analog to digital converter 406A, 406B. Samples of a received signal from each analog to digital converter 406A, 406B are passed to corresponding speed estimation units 408A, 408B which include a corresponding processor 410A, 410B loaded with system management software for executing the method of this invention. Samples of a received signal from each analog to digital converter 406A, 406B are also passed to a diversity combiner 407. An estimation of the speed of the mobile may be communicated from speed estimation units 408A, 408B to a speed combiner 440. Speed combiner 440 yields a combined speed estimation which is sent to a system controller 418 for use in making handoff decisions. Connected to diversity combiner 407, via signal processing unit 413, is phone service interface 414 for communicating with public telephone network 416.

It will be understood that diversity reception may be accomplished with multiple antennas and that the two antenna case is presented as an example.

Figure 5:
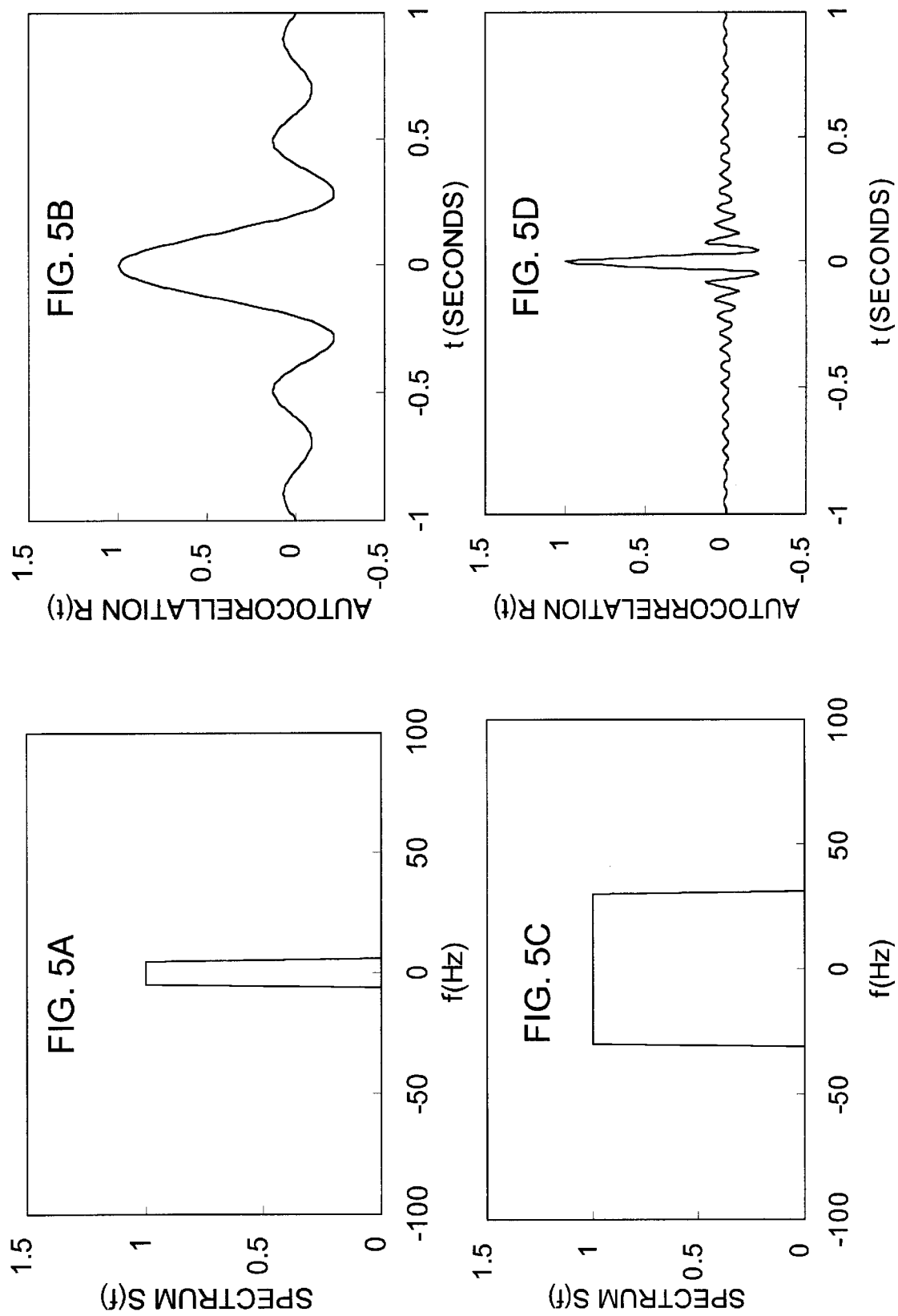
FIG. 5 illustrates autocorrelation functions of example frequency spectra.

It is well known that the power spectrum density function of a signal contains the same information as the autocorrelation function of that signal. As shown in FIG. 5 and J. G. Proakis and D. G. Manolakis, Digital Signal Processing—Principles, Algorithms, and Applications, 3rd ed., Prentice Hall Inc., New Jersey, 1996 (the contents of which are incorporated herein by reference), if the power spectrum is narrow (FIG. 5A), then the autocorrelation is wide (FIG. 5B) and if the power spectrum is wide (FIG. 5C), then the autocorrelation is narrow (FIG. 5D).

It is also well known that fast moving mobiles cause high Doppler frequencies and slow moving mobiles cause low Doppler frequencies. The frequency spectrum of a fast moving mobile, then, would have a wider frequency spectrum than a slow moving mobile, and consequently a more slender autocorrelation function. Therefore, we are led to believe that autocorrelation functions of fading signals may be used to estimate mobile speed.

It is known from, for instance, K. Feher, Wireless Digital Communications—Modulation & Spread Spectrum Applications, Prentice Hall Inc., New Jersey, 1995 (the contents of which are incorporated herein by reference) that a typical baseband time series signal received at the base station from a mobile is given by $$V_R(k) = A \cdot m(k) \cdot r(k) \cdot e^{j(\omega_0 k + \Psi_s(k) + \Psi_r(k))} + \sum_i A_{Ii}(k) \cdot e^{j\Psi_{Ii}(k)} + \mu(k) \quad (1)$$

where k represents a sample number, A is a constant, m(k) long-term fading, r(k) is short-term fading which contains a mobile's Doppler amplitude information, $\omega_0$ is the normalized carrier frequency offset, $\Psi_s(k)$ is the phase- or frequency-modulated information-bearing signal (baseband signal), $\Psi_r(k)$ is random phase which contains the mobile's Doppler phase information, $A_{Ii}(k)$ is time-variable amplitude of ith additive interference, $\Psi_{Ii}(k)$ is time-variable phase of ith additive interference and $\mu(k)$ is additive noise with complex value.

The power of the received signal is given as follows:

$$s(k)=|V_R(k)|^2=A^2m^2(k)r^2(k)+A_{total}(k) \quad (2)$$

Clearly, s(k) contains long-term fading and short-term fading information, and the total interference and noise $A_{total}(k)$.

An autocorrelation function is typically performed on a signal which is defined over all time. Indeed, a discrete autocorrelation of the power signal may be expressed as:

$$r(n) = \sum_{k=-\infty}^{\infty} s(k)s(k+n) \quad (3)$$

where n is the offset of the signal measured as a number of samples. (To apply the function of FIG. 5 to a discrete autocorrelation, the time, t, is replaced by n.)

Here, only a finite number of samples is available in obtaining the correlation. For this reason, the autocorrelation is an estimate which may be termed a "time-limited autocorrelation". The time-limited autocorrelation could take the following form:

$$r'(n) = \sum_{k=1}^{x} s(k)s(k+n) \quad (4)$$

where x is the number of samples considered. However, r'(n) would suffer from the 50 Hz interference caused by the boundary between slot bursts (occurring every 20 ms). This interference may be avoided by not crossing slot boundaries in performing the correlation operation. To accomplish this, the time-limited autocorrelation may correlate a power signal in one time slot with the power signal in another time slot offset by n slots. Given the few samples available in a single time slot, this same operation may be repeated for a series of time slots offset from each other by n slots. In particular, if N time slots are considered for the correlation, an offset autocorrelation function is as follows:

$$R(n) = \sum_{l=1}^{N-n} \sum_{k=1}^{K} s_{l+n}(k)s_l(k) \quad (5)$$

where $s_l(k)$ stands for lth-slot kth-sample of the received power signal s(k) and K is the number of samples per slot. For example, K can be, at most, 324 in IS-136 TDMA. The purpose of calculating R(n) based on equation (5) is to suppress the 50 Hz interference which originates from the slot burst time of 20 milliseconds. In other words, when we correlate the power signal in one slot with the power signal in another slot, we automatically suppress the 50 Hz interference. It will be appreciated that consecutively numbered slots for a given power signal are offset from each other by one slot burst time (20 ms).

As aforenoted, the faster a mobile moves, the more slender will be its power time-limited autocorrelation function. The 0 offset autocorrelation value, R(0), for R(n) defines the autocorrelation peak no matter how fast the mobile moves. On the other hand, any offset autocorrelation, which is defined as an autocorrelation value of R(n), for a given n≠0, will be lower the faster the mobile is moving.

It will be appreciated by a person skilled in the art that N will be chosen such that there may be no appreciable change in the measured speed of the mobile while the offset autocorrelation is being calculated.

To minimize the effect of total interference and noise on the power signal, we use a low pass Finite Impulse Response (FIR) filter to suppress noise and interference. Let h(k) be the impulse response of a selected FIR filter, then the filtered power signal is given by $$s_F(k) = s(k) \otimes h(k), \quad (6)$$

where $\otimes$ indicates convolution. As an alternative, it will be appreciated that an Infinite Impulse Response (IIR) filter is also suitable.

To ease the implied computational burden, we decimate the filtered power signals. Let $s_D(m)$ be the M times decimated signal from $s_F(k)$, which is given by $s_D(m) = s_F[(m-1)M+i]$ where $0 < i \leq M$. Then we have the offset autocorrelations of $s_F(k)$ and $s_D(m)$ as follows $$R_F(n) = \sum_{l=1}^{N-n} \sum_{k=1}^{K} s_{F_{l+n}}(k) s_{F_l}(k) \quad (7)$$

$$R_D(n) = \sum_{l=1}^{N-n} \sum_{m=1}^{\frac{K}{M}} s_{D_{l+n}}(m) s_{D_l}(m). \quad (8)$$

To minimize the effect of power fluctuations, we normalize the offset autocorrelation values as $R(n)/R(0)$, $R_F(n)/R_F(0)$ and $R_D(n)/R_D(0)$ where the time-limited autocorrelation value of the power signal for n=0 (i.e., the 0 offset case) is given by $$R(0) = \sum_{l=1}^{N} \sum_{k=1}^{K} s_l(k) s_l(k) \quad (9)$$

Figure 6:
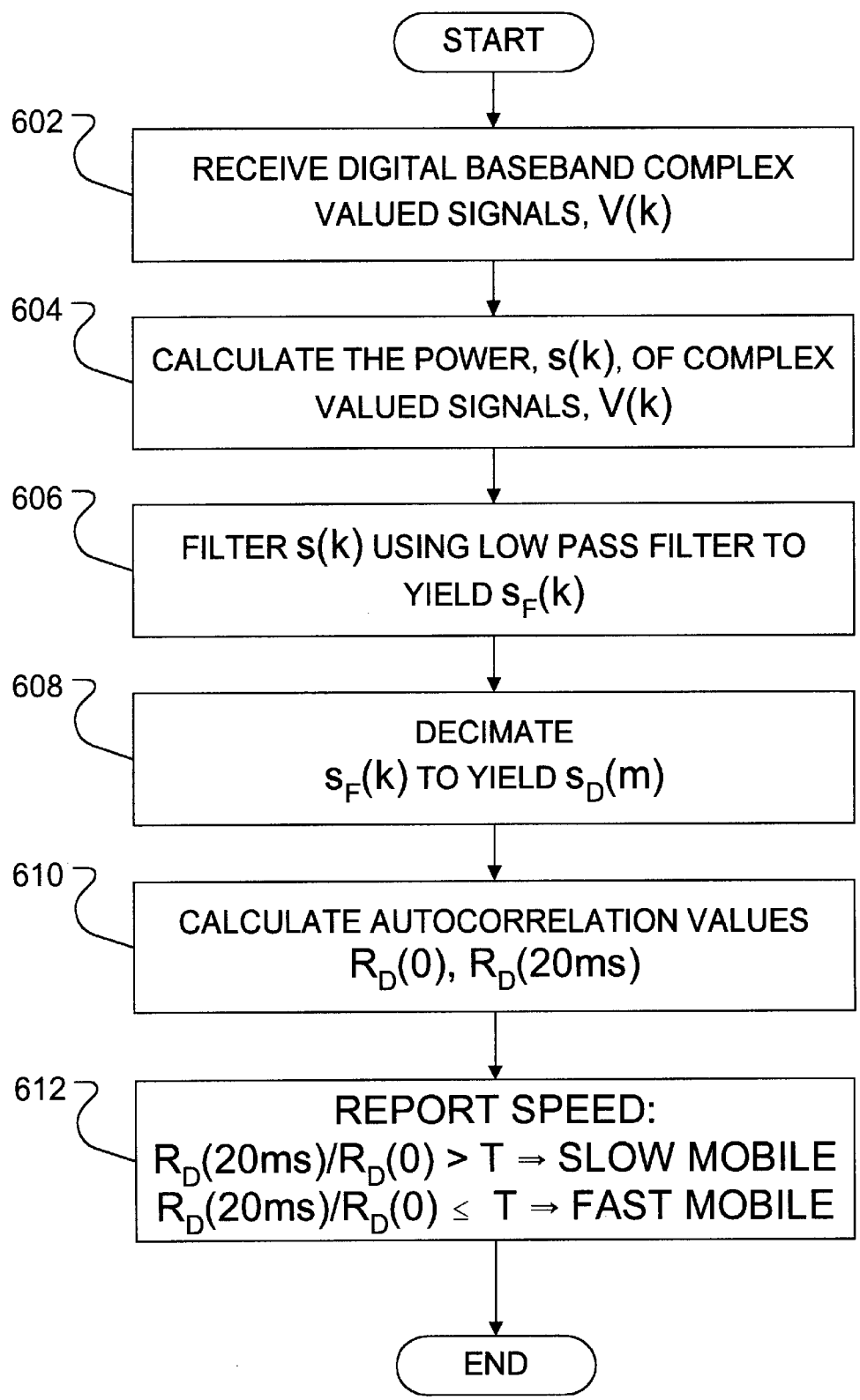
FIG. 6 illustrates, in a flow diagram, a procedure for estimating the speed of a mobile in an embodiment of the invention.

FIG. 6 is a flow diagram for software control for processor 210 of FIG. 2. A signal is received at antenna 202 (step 602). The power of the received signal, s(k), is calculated (step 604) and then processed by a digital low pass filter to give $s_F(k)$ (step 606). Preferably, the digital low pass filter has a finite impulse response. The filtered signal is then decimated resulting in $s_D(m)$ (step 608). The estimated offset autocorrelation value of $s_D(m)$, $R_D(n)$ is then calculated for n=1 and normalized, resulting in $R_D(1)/R_D(0)$ (step 610). Determining a value of $R_D(n)/R_D(0)$ when n=1 corresponds to a correlation of $s_D(m)$ to a version of $s_D(m)$ offset by one slot (20 ms). In particular, $$R_D(1) = \sum_{l=1}^{N-1} \sum_{m=1}^{\frac{K}{M}} s_{D_{l+1}}(m) s_{D_l}(m). \quad (10)$$

If $R_D(20 \text{ ms})/R_D(0)$ is greater than a threshold T a slow moving mobile may be reported. If $R_D(20 \text{ ms})/R_D(0)$ is less than a threshold T a fast moving mobile may be reported (step 612).

It will be appreciated by a person skilled in the art that the processor may be implemented simply, as the computations required of it involve only multiplication and addition.

It will also be appreciated by a person skilled in the art that rather than comparing a normalized $R_D(1)$ to a threshold, a normalized $R_D(n)$ with $n \neq 0,1$ may be compared to a threshold. As well, a value other than $R_D(0)$ may be used for normalizing.

As an option, instead of using $R_D(n)$ (which is the offset autocorrelation of the decimated and filtered power signal $s_D(m)$) as the offset autocorrelation value for comparison with a threshold, $R(n)$ or $R_F(n)$ (the offset autocorrelation of the filtered received signal power $s_F(k)$) may be used. $R_F(n)$ is, however, preferred to $R(n)$ because the gap between the $R_F(n)$'s of fast and slow moving mobiles is larger than the gap between comparable $R(n)$'s. Overall, $R_D(n)$ is preferred as it is more efficiently calculated than $R_F(n)$ and leads to a gap which is not significantly different than that found using $R_F(n)$.

Figure 7:
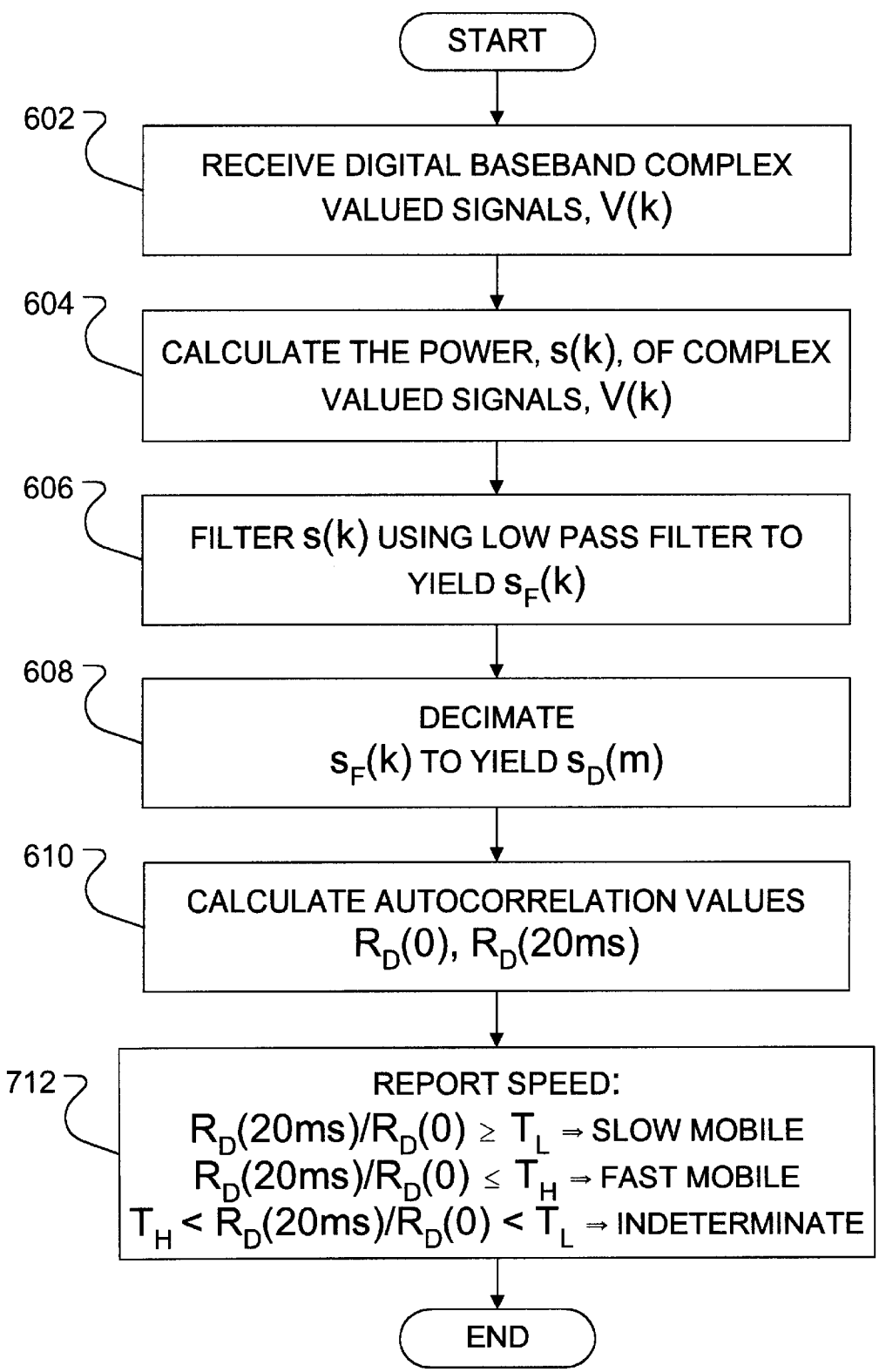
FIG. 7 illustrates, in a flow diagram, a procedure for estimating the speed of a mobile in an alternate embodiment of the invention.

Turning to FIG. 7, illustrating an alternate embodiment of the invention, it will be apparent that, except for step 712, the procedure is identical to that of FIG. 6 in the first embodiment, and like steps have been given like reference numerals. In step 712, if $R_D(20 \text{ ms})/R_D(0)$ is greater than a threshold $T_L$ a slow moving mobile may be reported. As well, if $R_D(20 \text{ ms})/R_D(0)$ is less than a threshold $T_H$ a fast moving mobile may be reported. However, if $R_D(20 \text{ ms})/R_D(0)$ is between the two thresholds, the speed is reported as indeterminate.

It will be understood that in hierarchical cellular systems comprising more than two layers, additional thresholds may be used to report a mobile's speed as being other than "fast" and "slow".

Although the mobile speed estimation technique has been described in conjunction with IS-136 TDMA, it also has application to other digital cellular radio systems, such as GSM TDMA-based systems. In GSM, each frame has eight slots. Frame duration (4.615 ms) in GSM is equal to slot burst duration, that is, each user uses only one slot.

Other modifications will be apparent to those skilled in the art and, therefore, the invention is defined in the claims.

We claim:

1. A method for estimating a speed of a mobile communication apparatus in a digital mobile communication network comprising:

receiving samples of a signal from said mobile communication apparatus, said samples arranged in time slots;

deriving a power signal from said samples; and estimating an offset autocorrelation value of said power signal by correlating said power signal with a version of itself offset in time, said offset autocorrelation value representative of said speed of said mobile communication apparatus, said estimating said offset autocorrelation value including:

for each of a plurality of time slots, estimating a single time slot offset autocorrelation value by correlating said power signal with a version of said power signal displaced by a predetermined number of time slots; and summing each said single time slot offset autocorrelation value to estimate said offset autocorrelation value.

2. The method of claim 1 further comprising filtering said power signal to limit noise and interference, prior to said estimating said offset autocorrelation value.

3. The method of claim 2 further comprising decimating said filtered power signal to reduce computational complexity, prior to said estimating said offset autocorrelation value.

4. The method of claim 1 wherein estimating each said single time slot offset autocorrelation value comprises, repetitively, multiplying a sample of said power signal from a given time slot with a corresponding sample of said power signal displaced by said predetermined number of time slots; and summing resultant products.

5. The method of claim 4 further comprising:

comparing said offset autocorrelation value to a first threshold after normalization; and if said offset autocorrelation value is less than said first threshold, indicating said speed of said mobile communication apparatus as "fast."

6. The method of claim 5 further comprising, if said offset autocorrelation value is greater than said first threshold, indicating said speed of said mobile communication apparatus as "slow."

7. The method of claim 5 further comprising:

comparing said offset autocorrelation value to a second threshold; and if said offset autocorrelation value is greater than said second threshold, indicating said speed of said mobile communication apparatus as "slow."

8. The method of claim 7 further comprising, if said offset autocorrelation value is greater than said first threshold and less than said second threshold, indicating said speed of said mobile communication apparatus as "indeterminate."

9. The method of claim 4 wherein said estimating comprises determining a time-limited offset correlation value of said power signal.

10. A computer software medium, for providing program control for a manager of a system, comprising:

means for receiving samples of a signal from a mobile communication apparatus;

means for deriving a power signal from said samples; and means for estimating an offset autocorrelation value of said power signal, said offset autocorrelation value representative of said speed of said mobile communication apparatus said estimating offset autocorrelation value including:

for each of a plurality of time slots, estimating a single time slot offset autocorrelation value by correlating the power signal with a version of the power signal displaced by a predetermined number of time slots, and summing each said signal time slot offset autocorrelation value to estimate said offset autocorrelation value.

11. A speed estimation apparatus comprising:

a receiver for receiving samples of a signal from a mobile communication apparatus;

means for deriving a power signal from said samples; and means for estimating an offset autocorrelation value of said power signal, said offset autocorrelation value representative of said speed of said mobile communication apparatus said estimating offset autocorrelation value including:

for each of a plurality of time slots, estimating a single time slot offset autocorrelation value by correlating the power signal with a version of the power signal displaced by a predetermined number of time slots, and summing each said signal time slot offset autocorrelation value to estimate said offset autocorrelation value.

12. A base station for mobile communications comprising:

at least one antenna for receiving a signal from a mobile communication apparatus;

at least one analog to digital converter for creating samples of said signal from said mobile communication apparatus;

a system controller;

a phone service interface; and at least one speed estimation apparatus operable to:

receive said samples of said signal from said mobile communication apparatus;

derive a power signal from said samples; and estimate an offset autocorrelation value of said power signal, said offset autocorrelation value representative of said speed of said mobile communication apparatus said estimating offset autocorrelation value including:

for each of a plurality of time slots, estimating a single time slot offset autocorrelation value by correlating the power signal with a version of the power signal displaced by a predetermined number of time slots, and summing each said signal time slot offset autocorrelation value to estimate said offset autocorrelation value.

13. A system for mobile communication comprising:

a mobile communication apparatus; and a base station including a speed estimation apparatus operable to:

receive samples of a signal from said mobile communication apparatus;

derive a power signal from said samples; and estimate an offset autocorrelation value of said power signal, said offset autocorrelation value representative of said speed of said mobile communication apparatus said estimating offset autocorrelation value including:

for each of a plurality of time slots, estimating a single time slot offset autocorrelation value by correlating the power signal with a version of the power signal displaced by a predetermined number of time slots, and summing each said signal time slot offset autocorrelation value to estimate said offset autocorrelation value are amendment.

14. The computer software medium of claim 10 further comprising means for filtering said power signal to limit noise and interference, prior to estimating said offset autocorrelation value.

15. The computer software medium of claim 14 further comprising means for decimating said filtered power signal to reduce computational complexity, prior to said estimating said offset autocorrelation value.

16. The speed estimation apparatus of claim 11 further comprising means for filtering said power signal to limit noise and interference, prior to estimating said offset autocorrelation value.

17. The speed estimation apparatus of claim 16 further comprising means decimating said filtered power signal to reduce computational complexity, prior to said estimating said offset autocorrelation value.

18. The base station of claim 12 wherein said at least one speed estimation apparatus is further operable to filter said power signal to limit noise and interference, prior to estimating said offset autocorrelation value.

19. The base station of claim 18 wherein said at least one speed estimation apparatus is further operable to decimate said filtered power signal to reduce computational complexity, prior to said estimating said offset autocorrelation value.

* * * * *

UNITED STATES PATENT AND TRADEMARK OFFICE
CERTIFICATE OF CORRECTION

PATENT NO. : 6,370,357 B1
DATED : April 9, 2002
INVENTOR(S) : Xiao et al.

It is certified that error appears in the above-identified patent and that said Letters Patent is hereby corrected as shown below:

Column 9,
Lines 1 and 21, "The method of claim 4" should be changed to -- The method of claim 1 --

Column 10,
Line 38, "relation value are amendment." should be changed to -- relation value. --

Signed and Sealed this

Sixteenth Day of December, 2003

JAMES E. ROGAN
*Director of the United States Patent and Trademark Office*